US012654909B2

(12) United States Patent
Wang et al.

(10) Patent No.: US 12,654,909 B2
(45) Date of Patent: Jun. 16, 2026

(54) HEAT RESISTANT THERMAL SEAL FILM

(71) Applicant: Dow Global Technologies LLC, Midland, MI (US)

(72) Inventors: Shijun Wang, Shanghai (CN); Jichang Feng, Shanghai (CN); Jianping Pan, Shanghai (CN); Xiaobing Yun, Shanghai (CN); Zhe Du, Shanghai (CN); Andong Liu, Shanghai (CN); Lin Liu, Shanghai (CN); Hong Yang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 19/167,892

(22) PCT Filed: Jun. 5, 2024

(86) PCT No.: PCT/CN2024/097586
§ 371 (c)(1),
(2) Date: Sep. 23, 2025

(87) PCT Pub. No.: WO2025/251222
PCT Pub. Date: Dec. 11, 2025

(65) Prior Publication Data
US 2026/0109515 A1     Apr. 23, 2026

(51) Int. Cl.
*B65D 65/40* (2006.01)
*B32B 1/00* (2006.01)
(Continued)

(52) U.S. Cl.
CPC ................ *B65D 33/22* (2013.01); *B32B 1/00* (2013.01); *B32B 27/08* (2013.01); *B32B 27/32* (2013.01);
(Continued)

(58) Field of Classification Search
CPC .. B32B 7/00; B32B 7/02; B32B 27/06; B32B 27/28; B65D 65/40; B65B 29/00
See application file for complete search history.

(56) References Cited

U.S. PATENT DOCUMENTS 3,673,050 A * 6/1972 Newman, Jr. ............ C08J 5/124
428/517
4,082,877 A * 4/1978 Shadle .................... B32B 27/08
264/171.26
(Continued)

FOREIGN PATENT DOCUMENTS

CN          1248988       3/2000
CN          103764395     4/2014
(Continued)

*Primary Examiner* — Gloria R Weeks
(74) *Attorney, Agent, or Firm* — Jacob R. Graham

(57) ABSTRACT
Multilayer films are disclosed. The multilayer film may include a core layer and a heat seal layer where the heat seal lay comprises a polypropylene copolymer and a polyethylene copolymer. The polypropylene copolymer of the heat seal layer has specific properties such as ethylene content and iCCD elution profile to contribute to the desirable properties of the film. The multilayer film can form effective heat seals, even when in contact with heated contents. The multilayer film can be formed into a bag where the bag is suitable for carrying hot or heated contents.

15 Claims, 1 Drawing Sheet iCCD Results

(51) Int. Cl.

| | | |
|---|---|---|
| *B32B 27/08* | (2006.01) | |
| *B32B 27/32* | (2006.01) | |
| *B65B 51/10* | (2006.01) | |
| *B65D 33/22* | (2006.01) | |

(52) U.S. Cl.

CPC .............. *B65B 51/10* (2013.01); *B65D 65/40* (2013.01); *B32B 2250/242* (2013.01); *B32B 2307/31* (2013.01); *B32B 2307/72* (2013.01); *B32B 2439/46* (2013.01)

(56) References Cited

U.S. PATENT DOCUMENTS

| | | | |
|---|---|---|---|
| 5,126,401 A * | 6/1992 | Chou ...................... C08L 77/06 | |
| | | | 525/60 |
| 5,169,728 A * | 12/1992 | Murphy ................. B32B 27/32 | |
| | | | 428/220 |
| 5,302,442 A * | 4/1994 | O'Brien ................. B32B 27/32 | |
| | | | 525/240 |
| 5,601,200 A | 2/1997 | Finkelstein et al. | |
| 6,194,533 B1 | 2/2001 | Nishimura et al. | |
| 8,263,206 B2 * | 9/2012 | Kronawittleithner .. B65D 33/01 | |
| | | | 428/476.3 |
| 8,877,310 B2 | 11/2014 | Kanai et al. | |
| 8,877,325 B2 * | 11/2014 | Gringoire .............. B05D 3/065 | |
| | | | 428/206 |
| 8,906,510 B2 * | 12/2014 | Song ...................... B32B 27/32 | |
| | | | 428/461 |
| 9,133,369 B2 * | 9/2015 | Gringoire .......... C09J 123/0876 | |
| 9,346,246 B2 * | 5/2016 | Bender ..................... B32B 1/00 | |
| 9,688,795 B2 | 6/2017 | Cerk et al. | |
| 9,969,853 B2 | 5/2018 | Hoya et al. | |
| 10,808,053 B2 | 10/2020 | Li et al. | |
| 11,071,801 B2 * | 7/2021 | Abbott .................. B01J 19/123 | |
| 11,603,242 B2 * | 3/2023 | Farkas .................. B32B 27/327 | |
| 2005/0058791 A1 * | 3/2005 | Moehlenbrock ........ B32B 27/08 | |
| | | | 428/138 |
| 2005/0129969 A1 * | 6/2005 | Schell ................... B32B 27/306 | |
| | | | 428/900 |
| 2007/0202337 A1 * | 8/2007 | Lischefski ........... B32B 27/304 | |
| | | | 428/411.1 |
| 2008/0050545 A1 * | 2/2008 | Harvey .................. B32B 27/34 | |
| | | | 428/36.3 |
| 2017/0008253 A1 | 1/2017 | Su et al. | |
| 2017/0008263 A1 | 1/2017 | Hu et al. | |
| 2017/0334175 A1 * | 11/2017 | Lawrence .............. B32B 27/32 | |
| 2018/0370199 A1 * | 12/2018 | Dabadie ................... B32B 7/12 | |
| 2019/0047265 A1 * | 2/2019 | Euler ..................... B65D 1/265 | |
| 2020/0361692 A1 * | 11/2020 | Jackson ................. B32B 27/34 | |
| 2020/0369014 A1 * | 11/2020 | Ambroise ............ B32B 27/302 | |
| 2021/0347101 A1 * | 11/2021 | Dabadie ................. B29C 55/28 | |
| 2022/0274383 A1 * | 9/2022 | Alaboson ................. B32B 1/00 | |
| 2023/0302776 A1 * | 9/2023 | Feng ........................ B32B 7/02 | |

FOREIGN PATENT DOCUMENTS

| | | |
|---|---|---|
| CN | 106892218 | 6/2017 |
| CN | 110072698 | 7/2019 |
| CN | 111757809 | 10/2020 |
| CN | 112961440 | 6/2021 |
| JP | 5525847 | 6/2014 |
| JP | 2022122708 | 8/2022 |
| KR | 19980077268 | 11/1998 |
| WO | 2011149886 | 12/2011 |
| WO | 2017040127 | 3/2017 |
| WO | 2022082369 | 4/2022 |

* cited by examiner iCCD Results
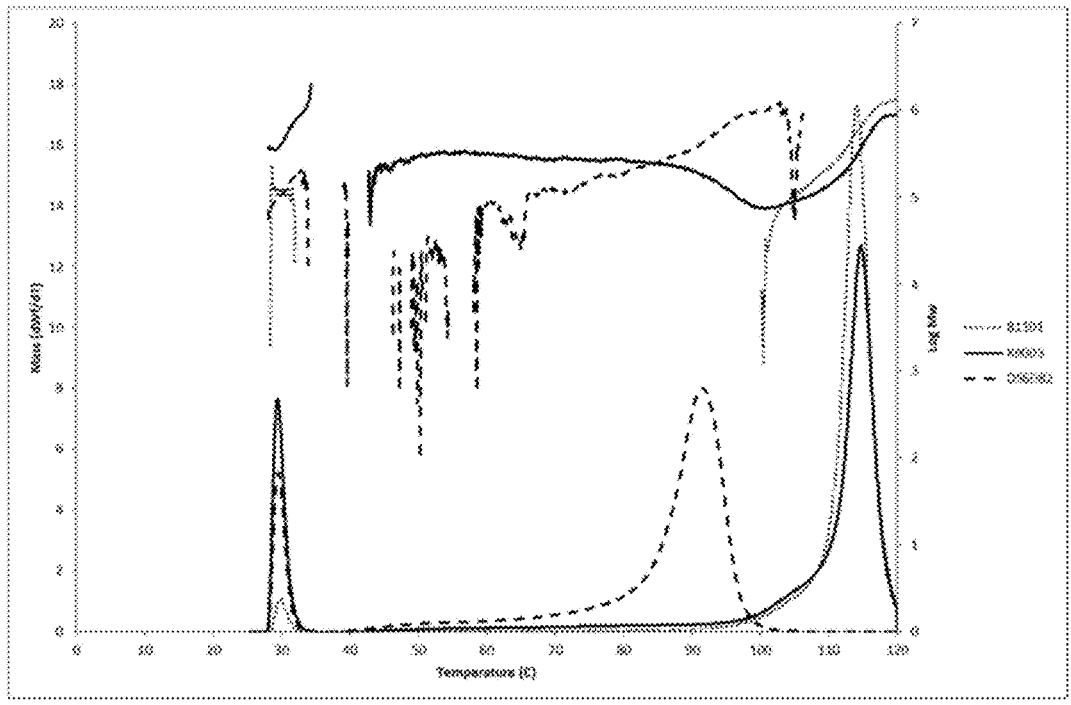

HEAT RESISTANT THERMAL SEAL FILM

TECHNICAL FIELD

Embodiments described herein generally relate to multilayer films and, more specifically, to multilayer films suitable for heat-seal packaging.

BACKGROUND

Heat-sealable bags made from multilayer films are a common form of packaging. The multilayer film can comprise a core polymer layer that delivers desired strength and other film properties and comprises a heat seal layer. The multilayer film may also comprise other layers, such as barrier layers, tie layers, print layers or metal foil layers. The multilayer film can be folded and sealed to form a bag that is open on one end and closed on other sides and ends. Contents can be added to the bag though the open end, where the open end is pinched shut with the heat seal layers on both pinched sides in contact with each other and heated to seal the open end.

Many factors can influence the strength of heat seals, including the length and width of the seal, the temperature and pressure used to create the seal, the time that temperature and pressure is maintained, and the contents of the heat seal layer. Packagers frequently want to run packaging lines quickly, so the heat seal layer is typically selected to form a strong seal using only a short cycle of pressure, heating, and cooling.

Many heat-sealable bags contain hot contents, such as hot food or even hot asphalt. Heated contents can prevent the heat seal from cooling after it is formed and can significantly reduce the strength of the seal.

Accordingly, there is a need for multilayer films comprising polymer combinations that can be used in a heat seal layer and can form strong heat seals even when in contact with heated contents.

SUMMARY

A first aspect of the present invention is a multilayer film. A multilayer film according to embodiments disclosed herein comprises at least (A) a core layer that comprises a polyolefin polymer and (B) a heat seal layer, wherein the heat seal layer comprises: a. from 30 to 80 weight percent of a polypropylene copolymer having: i) a total ethylene content (Et) from 5 to 30 weight percent, based on the total weight of the polypropylene copolymer; and ii) a density from 0.80 to 0.95 g/cc; and iii) a melt index at 230° C. of no more than 5 dg/min; and iv) an iCCD profile where in iCCD elution testing from 25° C. to 150° C., elutes at least 10 weight percent of the polypropylene copolymer from 25° C. to 35° C. and no more than 30 weight percent of the polypropylene copolymer between 35° C. and 100° C.; and b. from 20 to 70 weight percent of a polyethylene copolymer having a density from 0.895 to 0.925 g/cc and melt index at 190° C. below 3 dg/min.

A bag comprising a multilayer film according to embodiments is also disclosed.

A process to package heated materials is also disclosed. The process according to embodiments disclosed herein comprises the steps of a. placing materials with a temperature of at least 90° C. in a bag from the second aspect of this invention that is open at one end, and b. heat sealing the open end of the bag to fully close the bag.

Multilayer films of this invention can form strong heat seals even when in contact with heated contents up to 140° C. or more.

BRIEF DESCRIPTION OF THE DRAWINGS

FIG. 1 shows the results of an iCCD analysis performed on three polypropylene resins used in the working examples.

DETAILED DESCRIPTION

This invention relates to a multilayer film that comprises at least a core layer and a heat seal layer. In some embodiments, the multilayer film comprises at least 3 layers or at least 4 layers or at least 5 layers. In some embodiments, the multilayer film comprises at most 20 layers or at most 15 layers or at most 10 layers or at most 9 layers or at most 8 layers or at most 7 layers. The multilayer film may comprise at least a core layer that comprises a polyolefin polymer and a heat seal layer, wherein the heat seal layer comprises a polypropylene copolymer and a polyethylene copolymer.

One layer in the multilayer film is a core layer that comprises a polyolefin polymer. Polyolefin polymers include polyethylene or polypropylene or a blend of polyethylene and polypropylene.

"Polyethylene" or "ethylene-based polymer" as used herein refers to polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

Grades of polyethylene that are commonly used in multilayer films include:

High density polyethylene (HDPE), which has a density from 0.94 g/cc to 0.98 g·cc;

Linear low density polyethylene (LLDPE), which has a density from 0.915 g/cc to 0.94 g/cc;

low density polyethylene (LDPE), which has a density from 0.90 g/cm3 to 0.93 g/cm$^3$; and/or very low density polyethylene (VLDPE), which has a density from 0.88 g/cc to 0.915 g/cc.

Grades of polypropylene that are commonly used in multilayer films include:

polypropylene homopolymers;

polypropylene random copolymers; and polypropylene block copolymers.

Certain polypropylene copolymers, called "impact copolymers," can have a rubber content that imparts higher impact resistance. In some embodiments, impact copolymers comprise block copolymers of propylene and ethylene, which contain blocks with low ethylene content and blocks with high ethylene content. In some embodiments, impact copolymers comprise polypropylene random copolymers and/or polypropylene polymer blends.

In some embodiments, "polyethylene" is a copolymer that comprises repeating units derived from ethylene with repeating units derived from other 1-olefins such a 1-butene, 1-hexene and/or 1-octene. (Unless otherwise indicated, "primarily" means more than 50 weight percent.) Likewise, polypropylene (PP) random and block copolymers may comprise repeating units derived propylene, and repeating units derived from ethylene. Varying the selection and proportions of monomers, the catalysts used to make the polyolefin and the reaction conditions can produce a broad range of different polyolefin grades that have different properties such as density, melt viscosity, and physical strength.

In some embodiments, the core layer can comprise polymers to achieve desired physical properties for the film, such as tensile strength and modulus, dart impact strength, tear strength, temperature resistance and melt strength. In some embodiments, the core layer comprises HDPE. In some embodiments, the core layer comprises LLDPE. In some embodiments, the core layer comprises a polyethylene having a density from 0.895 to 0.930 g/cc and a melt index at 190° C. below 3 dg/min. In some embodiments, the core layer comprises VLDPE. In some embodiments, the core layer comprises a polyethylene having a density of at least 0.890 g/cc or at least 0.895 g/cc or at least 0.900 g/cc or at least 0.905 g/cc or at least 0.907 g/cc or at least 0.910 g/cc. In some embodiments, the core layer comprises a polyethylene having a density of at most 0.930 g/cc or at most 0.925 g/cc or at most 0.922 g/cc or at most 0.920 g/cc.

In some embodiments, the core layer comprises a polyethylene having a melt index (I2) at 190° C. of no more than 5 dg/min. or no more than 4 dg/min. or no more than 3 dg/min. or no more than 2 dg/min. or no more than 1 dg/min. or no more than 0.8 dg/min. or no more than 0.6 dg/min or no more than 0.4 dg/min. In some embodiments, the core layer comprises a polyethylene having a melt index (I2) at 190° C. of at least 0.01 dg/min. or at least 0.05 dg/min. or at least 0.1 dg/min.

In some embodiments, the core layer comprises a polypropylene homopolymer. In some embodiments, the core layer comprises a polypropylene random copolymer. In some embodiments, the core layer comprises polypropylene block copolymer. In some embodiments, the polypropylene in the core layer has a density of at least 0.890 g/cc or at least 0.895 g/cc or at least 0.900 g/cc. In some embodiments, the polypropylene in the core layer has a density of at most 0.92 g/cc or at most 0.91 g/cc or at most 0.905 g/cc. In some embodiments, the polypropylene in the core layer has a melt index (I2) at 230° C. of at most 6 dg/min. or at most 4 dg/min or at most 3 dg/min. In some embodiments, the polypropylene in the core layer has a melt index (I2) at 230° C. of at least 0.5 dg/min. or at least 1 dg/min or at least 2 dg/min.

In some embodiments, the core layer comprises a blend of two or more polyolefin polymers, such as at least 2 polyethylene polymers or at least 2 polypropylene polymers or at least one polyethylene blended with at least one polypropylene (PP) polymer. Examples of common polymer blends include blends of polyolefins, such as blending high density polyethylene (HDPE) or linear low-density polyethylene (LLDPE) with low density polyethylene (LDPE) or with polyethylene elastomers. Some polypropylenes are incompatible with polyethylene and may require a compatibilizer. On the other hand, some polypropylenes blend effectively with polyethylene and do not require a compatibilizer. For example, polypropylene block copolymers that comprise blocks of polyethylene are more likely to blend effectively with polyethylene, especially lower density polyethylenes with relatively high levels of comonomer.

In some embodiments, the core layer comprises a blend of polyethylene with polypropylene copolymer that has the same characteristics as the polypropylene copolymer used in the heat seal layer.

In some embodiments, the core layer comprises at least 10 weight percent of a polypropylene copolymer or at least 15 weight percent or at least 20 weight percent or at least 25 weight percent or at least 30 weight percent or at least 35 weight percent or at least 40 weight percent or at least 42 weight percent or at least 45 weight percent. In some embodiments, the core layer comprises at most 65 weight percent of the polypropylene copolymer or at most 60 weight percent or at most 55 weight percent or at most 50 weight percent or at most 48 weight percent or at most 45 weight percent, based on the total weight of the core layer. In some embodiments, the core layer comprises at least 35 weight percent of polyethylene or at least 40 weight percent or at least 45 weight percent or at least 50 weight percent or at least 52 weight percent or at least 55 weight percent. In some embodiments, the core layer comprises 100 weight percent polyethylene or at most 90 weight percent or at most 85 weight percent or at most 80 weight percent or at most 75 weight percent or at most 70 weight percent or at most 65 weight percent or at most 60 weight percent or at most 55 weight percent, based on total weight of the core layer.

The multilayer film has two outside faces opposite each other, and the polymer layer on each face of the film is called a face layer. In films of this invention, one face layer is a heat seal layer. In two layer films, the other face layer is the core layer. In three-or-more layer films, the other face layer may be the core layer or another polymer layer.

The heat seal layer can comprise a. from 30 to 80 weight percent of a polypropylene copolymer, based on total weight of the heat seal layer, that: i. comprises from 5 to 30 weight percent repeating units derived from ethylene; and i. has a density from 0.80 to 0.95 g/cc; and ii. has a melt index at 230° C. of no more than 5 dg/min; and iii. in iCCD elution testing from 25° C. to 150° C., at least 10 weight percent of the PP copolymer elutes from 25° C. to 35° C. and no more than 30 weight percent of the PP copolymer elutes between 35° C. and 100° C.; and from 20 to 70 weight percent of a polyethylene copolymer having density from 0.895 to 0.925 g/cc and melt index at 190° C. below 3 dg/min. The iCCD elution testing is performed via the test method description below.

In some embodiments, the polypropylene copolymer has a density of at least 0.85 g/cc or at least 0.88 g/cc or at least 0.89 g/cc or at least 0.895 g/cc or at least 0.90 g/cc. In some embodiments, the polypropylene copolymer has a density of at most 0.92 g/cc or at most 0.91 g/cc or at most 0.905 g/cc.

In some embodiments, the polypropylene copolymer in the heat seal layer has a melt index (I2) at 230° C. of at most 4 dg/min or at most 3 dg/min. In some embodiments, the polypropylene copolymer has a melt index (I2) at 230° C. of at least 0.5 dg/min. or at least 1 dg/min or at least 2 dg/min.

Polypropylene copolymers may be characterized based on total ethylene content (Et), which is the average weight percentage of repeating units that are derived from ethylene, based on the total weight of the polypropylene copolymer. In some embodiments, the total ethylene content (Et) of the polypropylene copolymer is at least 8 weight percent or at least 10 weight percent or at least 12 weight percent. In some embodiments, the total ethylene content (Et) of the polypropylene copolymer is at most 28 weight percent or at most 25 weight percent or at most 20 weight percent. In some embodiments, the polypropylene copolymer comprises at most 92 weight percent repeating units derived from propylene, or at most 90 weight percent or at most 88 weight percent. In some embodiments, the polypropylene copolymer comprises at least 72 weight percent repeating units derived from propylene, or at least 75 weight percent or at least 80 weight percent. In some embodiments, the polypropylene copolymer comprises at most 10 weight percent repeating units derived from monomers other than propylene and ethylene, or at most 5 weight percent or at most 2 weight percent or at most 1 weight percent or 0 weight percent, based on the total weight of the polypropylene copolymer.

In some embodiments, the polypropylene copolymer in the heat seal layer is a random copolymer. In some embodiments, the polypropylene copolymer in the heat seal layer is an impact copolymer that comprises a component of crystalline polypropylene homopolymer or polypropylene copolymer called a crystalline phase and a component of amorphous ethylene-propylene random copolymer, called a rubber phase. The crystalline phase can have a low ethylene content, whereas the rubber phase has a higher ethylene content than the crystalline phase. In some embodiments, the impact polypropylene copolymer is a block copolymer, in which segments of crystalline phase polymer and segments of rubber phase polymer are bound to each other.

Cong et al., PCT Patent Application WO2017/040127 A1 (9 Mar. 2017) describes an improved method to measure comonomer content and distribution of polyolefins (iCCD), which is adapted from temperature rising elution fractionation (TREF). The Test Methods describe specific implementation of the iCCD analysis. In iCCD analysis, a polymer can be divided into a fraction that elutes at low temperature (from 25° C. to 35° C.), a fraction that elutes at medium temperature (from more than 35° C. to 105° C.), and a fraction that elutes at high temperature (more than 105° C.).

In iCCD analysis as described in the Test Methods, the polypropylene copolymer used in the heat seal layer has at least 10 weight percent of the polymer recovered in the low temperature fraction. In some embodiments, the low temperature fraction is at least 12 weight percent or at least 14 weight percent or at least 15 weight percent. In some embodiments, the low temperature fraction is at most 30 weight percent or at most 25 weight percent or at most 20 weight percent or at most 18 weight percent or at most 16 weight percent.

In iCCD analysis as described in the Test Methods, the polypropylene copolymer used in the heat seal layer has at most 30 weight percent of the polymer recovered in the medium temperature fraction. In some embodiments, the medium temperature fraction is at most 25 weight percent or at most 20 weight percent or at most 18 weight percent or at most 16 weight percent or at most 15 weight percent. In some embodiments, the medium temperature fraction is at least 5 weight percent or at least 8 weight percent or at least 10 weight percent or at least 12 weight percent or at least 14 weight percent.

In some embodiments, the polypropylene copolymer in the heat seal layer has a tensile yield strength of at least 18 MPa or at least 20 MPa or at least 22 MPa or at least 24 MPa. In some embodiments, the polypropylene copolymer has a tensile yield strength of at most 40 MPa or at most 30 MPa or at most 28 MPa or at most 26 MPa.

Suitable polypropylene copolymers for the heat seal layer are commercially available as previously described. Others can be made by known processes.

In some embodiments, the polyethylene copolymer in the heat seal layer can have a density from 0.895 to 0.925 g/cc. In some embodiments, the density of the polyethylene copolymer is at least 0.900 g/cc or at least 0.905 g/cc or at least 0.907 g/cc or at least 0.910 g/cc. In some embodiments, the density of the polyethylene copolymer is at most 0.922 g/cc or at most 0.920 g/cc or at most 0.915 or at most 0.912 or at most 0.910.

The polyethylene copolymer in the heat seal layer can have a melt index (I2) at 190° C. below 3 dg/min. In some embodiments, the melt index (I2) of the polyethylene copolymer at 190° C. is at most 2 dg/min or at most 1.5 dg/min or at most 1 dg/min or at most 0.9 dg/min. In some embodiments, the melt index (I2) of the polyethylene copolymer at 190° C. is at least 0.1 dg/min. or at least 0.3 dg/min. or at least 0.5 dg/min or at least 0.7 dg/min or at least 0.8 dg/min.

In some embodiments, the polyethylene copolymer in the heat seal layer can have a melting temperature of at least 85° C. or at least 90° C. or at least 95° C. or at least 100° C. or at least 102° C. or at least 104° C. or at least 106° C. In some embodiments, the polyethylene copolymer in the heat seal layer can have a melting temperature of at most 125° C. or at most 120° C. or at most 115° C. or at most 110° C. or at most 108° C. or at most 106° C.

In some embodiments, comonomers in the polyethylene copolymer in the heat seal layer comprises on from 4 to 10 carbon atoms. In some embodiments, the comonomers comprise butene. In some embodiments the comonomers comprise or consist essentially of hexene. In some embodiments the comonomers comprise or consist essentially of octene. ("Consist essentially of" means that any other monomers are in a concentration low enough that the other monomers do not materially change the properties of the resulting polymer.)

In some embodiments, the polyethylene copolymer in the heat seal layer comprises at least 2 weight percent repeating units derived from comonomers, or at least 5 weight percent or at least 10 weight percent. In some embodiments, the polyethylene copolymer in the heat seal layer comprises at most 35 weight percent repeating units derived from comonomers, or at most 30 weight percent or at most 25 weight percent. Units not derived from comonomers are derived from ethylene.

In some embodiments, the polyethylene copolymer in the heat seal layer comprises a blend of 2 or more polyethylene copolymers that individually and/or collectively meet the previously stated limits and/or embodiments.

Suitable polyethylene copolymers for the heat seal layer are commercially available. Others can be made by known processes.

The heat seal layer can comprise from 30 to 80 weight percent of the polypropylene copolymer. In some embodiments, the heat seal layer comprises at least 33 weight percent of the polypropylene copolymer or at least 36 weight percent or at least 39 weight percent or at least 40 weight percent. In some embodiments, the heat seal layer comprises at most 75 weight percent of the polypropylene copolymer or at most 70 weight percent or at most 60 weight percent or at most 50 weight percent or at most 45 weight percent or at most 40 weight percent.

The heat seal layer can comprise from 20 to 70 weight percent of the polyethylene copolymer. In some embodiments, the heat seal layer comprises at least 25 weight percent of the polyethylene copolymer or at least 30 weight percent or at least 40 weight percent or at least 50 weight percent or at least 55 weight percent or at least 60 weight percent. In some embodiments, the heat seal layer comprises at most 67 weight percent of the polyethylene copolymer or at most 64 weight percent or at most 61 weight percent or at most 60 weight percent.

In some embodiments, the heat seal layer comprises at most 30 weight percent of other polymers in addition to the polypropylene copolymer and the polyethylene copolymer, or at most 20 weight percent of other polymers or at most 10 weight percent or at most 5 weight percent or at most 2 weight percent or 0 weight percent. Examples of other polymers used in the heat seal layer may include ethylene vinyl acetate copolymers.

In some embodiments, the polypropylene and polyethylene copolymers in the heat seal layer are compatible with each other, meaning that they form a homogeneous blend without a compatibilizer. In some embodiments, the heat seal layer further comprises a compatibilizer, as previously discussed. Examples of suitable compatibilizers are commercially-available under the INTUNE™ trademark.

In some embodiments, the heat seal layer is at least 5 micron thick or at least 10 micron or at least 15 micron thick or at least 20 micron thick at least 50 micron thick at least 100 micron thick at least 150 micron thick at least 200 micron thick. In some embodiments, the heat seal layer is at most 300 micron thick or 250 micron thick or 200 micron thick or at most 150 micron or at most 120 micron thick or at most 100 micron thick or at most 80 micron thick. For example, in some embodiments, the heat seal layer is from 15 to 100 micron thick or from 20 to 80 micron thick. In some embodiments, the heat seal layer is from 80 to 300 micron thick or from 100 to 200 micron thick.

The thickness of the core layer can vary. In some embodiments, the core layer is at least 50 micron thick or at least 60 micron thick or at least 70 micron thick. In some embodiments, the core layer is at most 300 micron thick or at most 250 micron thick or at most 200 micron thick or at most 150 micron thick.

In some embodiments, the core layer is thicker than the heat seal layer. In some embodiments, the thickness of the core layer is at least 100 percent the thickness of the heat seal layer, or at least 110 percent or at least 125 percent or at least 150 percent or at least 175 percent or at least 190 percent. In some embodiments, the thickness of the core layer is at most 1000 percent the thickness of the heat seal layer, or at most 800 percent or at most 500 percent or at most 400 percent or at most 300 percent.

In some embodiments, the multilayer film comprises only the core layer and the heat seal layer. In some embodiments, the multilayer film comprises at least 3 layers or at least 4 layers or at least 5 layers. In some embodiments, the multilayer film comprises at most 20 layers or at most 15 layers or at most 10 layers or at most 9 layers or at most 8 layers or at most 7 layers.

In some embodiments, other layers comprise polyolefins, as previously described. In some embodiments, all or essentially all polymers in the multilayer film are polyolefins, as previously described. "Essentially all" means that the quantity of non-polyolefin polymers is small enough that the non-polyolefin polymers do not materially change the properties of the film.

In some embodiments, other layers comprise non-polyolefin polymers. Common non-polyolefin polymers used in multilayer films include polyethylene terephthalate (PET) such as Mylar, polystyrene (PS and high impact polystyrene, HIPS), polyvinyl chloride (PVC), polyvinylidene chloride (PVDC), polyamides (PA) including nylons, ethylene vinyl alcohol (EVOH), ethylene-vinyl acetate (EVA).

In some embodiments, the multilayer film comprises a barrier layer to reduce the flow of water, air or flavor components through the multilayer film. Common barrier layers comprise EVOH, polyamide or PVDC.

In some embodiments, a "tie layer" may be added between two layers that adhere poorly to each other to prevent the layers from delaminating. The tie layer usually comprises a polymer or polymer blend that has good adhesion to both of the layers that are adjacent to the tie layer. Suitable tie layer polymers are known and commercially available. Examples of suitable tie layers for polyolefins are sold under the INTUNE™ and VERSIFY™ trademarks. Examples of suitable tie layer polymers for adhering polyolefins to non-polyolefin polymers are sold under the AMPLIFY™ and BYNEL™ trademarks.

In some embodiments, the face layer opposite the heat seal layer is a print layer, which comprise a polymer that provides a good external appearance and provides a good surface for printing. Examples of polymers used in print layers include polyethylene and polypropylene and blends thereof.

In some embodiments, the face layer opposite the heat seal layer is a second heat seal layer. The second heat seal layer may independently have contents as described for the first heat seal layer. Alternatively, the second heat seal layer may comprise other polymers, such as ethylene vinyl acetate copolymers.

In some embodiments, the core layer and the heat seal layer adhere directly to each other. In some embodiments, the core layer and the heat seal layer are bound together by a tie layer. In some embodiments, one or more other layers intervene between the core layer and the heat seal layer. For example, the multilayer film may comprise a barrier layer between the core layer and the heat seal layer, and optionally one or more tie layers to adhere the barrier layer to the core layer and/or the heat seal layer.

In some embodiments, the polymers in one or more layers of the multilayer film may comprise additives. Examples of common additives include antistatic agents, color enhancers, dyes, lubricants, fillers, pigments, primary antioxidants, secondary antioxidants, processing aids, UV stabilizers, nucleators, slip agents such as erucamide, antiblock agents such as talc, and combinations thereof. In some embodiments, additives make up no more than 5 weight percent of any polymer or no more than 4 weight percent or no more than 3 weight percent or no more than 2 weight percent or no more than 1 weight percent, based on the total weight of such polymer. In some embodiments, additives make up essentially 0 weight percent of the polymer composition. In some embodiments, layers that will form the inside surface of a bag comprise only additives that are approved for food contact by applicable regulatory authorities.

The multilayer films of this invention can be made by conventional coextrusion processes, such as cast film or blown film processes. In examples of a coextrusion process, different polymer compositions intended for different layers of the multilayer film are softened (and optionally blended) in separate extruders and expelled to a multilayer extrusion die, which extrudes each polymer composition as one or more layers in a multilayer film. In examples of a cast film process, a flat die extrudes the multilayer film onto a rotating drum, which may draw on the film and stretch the film in the machine direction to orient it uniaxially. In examples of a blown film process, an annular die extrudes a tube of the multilayer film, which is drawn over a bubble of gas to stretch the film in both the machine and transverse directions and biaxially orient the film. The tubular film may then be slit to form one or more flat films. Suitable coextrusion processes for multilayer films are well known.

In some embodiments, such as when a cast film process is used, the multilayer film is uniaxially oriented. In some embodiments, such as when a blown film process is used, the multi-layer film is biaxially oriented.

The thickness of the film can vary depending on its intended use and properties. In some embodiments, the multilayer film is at least 90 micron thick or at least 110 micron or at least 130 micron. In some embodiments, the multilayer film is at most 350 micron thick or at most 300 micron thick or at most 250 micron or at most 200 micron.

In some embodiments, the multilayer film has an MD tensile strength of at least 25 MPa or at least 30 MPa or at least 35 MPa. There is no maximum desired tensile strength, but in some cases tensile strength above 100 MPa may be unnecessary.

In some embodiments, the multilayer film has a 2% secant modulus of at least 250 MPa or at least 300 MPa or at least 350 MPa. There is no maximum desired 2% secant modulus, but in some cases 2% secant modulus above 1000 MPa may be unnecessary.

In some embodiments, the multilayer film has a dart impact strength of at least 400 g or at least 450 g or at least 500 g. There is no maximum desired dart impact strength, but in some cases tensile strength above 1000 g may be unnecessary.

In some embodiments, the multilayer film has an MD Elmendorf tear strength of at least 400 g or at least 450 g or at least 500 g. In some embodiments, the multilayer film has an MD Elmendorf tear strength of at most 1200 g.

In some embodiments, when tested according to the Test Methods at a sealing temperature of 170° C., the multilayer film provides a seal strength of at least 40 N/25 mm or at least 45 N/25 mm or at least 50 N/25 mm or at least 55 N/25 mm or at least 58 N/25 mm or at least 60 N/25 mm. There is no maximum desired seal strength, but in some cases seal strength above 120 N/25 mm may be unnecessary.

In some embodiments, after Gelbo flex testing for 5400 cycles, the multilayer film has at most 20 pinholes, or at most 15 or at most 10 or at most 8 or at most 6 or at most 4. In some embodiment, the multilayer film has no pinholes or at least 1 pinhole or at least 2 pinholes.

In some embodiments, the multilayer film is formed into an open bag, such as by:

folding the film along the long (machine) dimension to form a tube with heat seal layers at the edges of the film in contact with each other;

pressing the edges of the film together with heat to seal the film tube closed;

pressing the tube together transversely to the long (machine) dimension with heat to close one end of the tube and form a bag that is open at one end and closed at the other end; and cutting the tube below the transverse heat seal to separate the bag from the remainder of the tube, or partially perforating or otherwise weakening the tube below the transverse heat seal, so that the bag can be torn away from the tube at a later time.

In some embodiments, the bag is filled online as it is formed and sealed shut with a second transverse heat seal at the open end of the bag. For example, the film may be used in a conventional form, fill and seal processes. Alternately, in some embodiments, the bag may be recovered and stored empty with one end open, to be filled and heat-sealed at a different time. Alternatively, in some embodiments, the tube may be partially perforated or otherwise weakened below the transverse heat seal and then rolled, to provide a tubular roll from which bags can be torn at a later time; tearing off a bag provides the open end for the next bag on the roll.

In some embodiments, bags of this invention comprise a tube of the multilayer film that is sealed at one end and open at the other end. In such an embodiment, the heat-seal layer can be on the inside of the bag, so that the bag can be sealed by pinching the opposite sides at the open end of the bag together across the opening and heating them to seal them together. However, other more complex embodiments are also possible.

In a process of this invention, contents are placed in the bag, and the open end is heat sealed.

Bags made using the multilayer film may be particularly useful when the contents placed in the bag hot, and the bag is heat sealed before the hot contents can cool. In some embodiments, the contents of the bag are at a temperature of at least 90° C. when the bag is sealed, or at least 100° C. or at least 110° C. or at least 120° C. or at least 130° C. or at least 140° C. In some embodiments, the contents of the bag are at a temperature of at most 150° C. when the bag is sealed, or at most 145° C. or at most 140° C.

In some embodiments, when in contact with hot contents at a temperature up to 140° C., the multilayer film provides a heat seal strength of at least 40 N/25 mm or at least 45 N/25 mm or at least 50 N/25 mm. There is no maximum desired seal strength, but in some cases seal strength above 120 N/25 mm may be unnecessary.

Test Methods

The following test methods are used in this application:

| Density of Polymers | ASTM D792 |
|---|---|
| Melt Index ($I_2$) | ASTM D1238. |
| Ethylene Content of Copolymer (Et) | 200 mg polyolefin resin and 2 mL TCE-d2 (with 8 mmol Cr(acac)$_3$) are heated and agitated at 120° C. in a 10 mm NMR tube, the mixture was heated at 120° C. until a homogeneous solution is achieved. The samples are analyzed in a Bruker AVANCE II 400 MHz spectrometer, Pulse program: QA-RINEPT, D1 = 3.5 s, NS = 128. |
| iCCD | See description below |
| Tensile Yield Strength | ASTM D638 |
| Melting Temperature ($T_m$) | Measured by differential scanning calorimetry (DSC) conducted on a TA instruments Q2000 series differential scanning calorimeter with a heating and cooling rate of 10° C./min under the nitrogen atmosphere. Three cycles are conducted. 1st from ambient to 250° C., 2nd from 250° C. to −80° C., and 3rd from 0 to 250° C. The endotherm (melting) peak in the 3rd cycle is analyzed using Integrate Peak Signal Horizontal method in the TA universal analysis software to obtain DSC $T_m$ for each sample. |

-continued

| Tensile Strength & Modulus | ASTM D882 |
| Elmendorf Tear | ASTM D1922 |
| Dart Impact | ASTM 1702A |
| Gelbo Flex Test | ASTM F392 |
| Seal Strength | See Description Below |

Note:

Polyethylene melt index is tested at 190° C., and polypropylene melt index is tested at 230° C.

iCCD Analysis: The iCCD process is described in Cong et al., PCT Publication WO2017/040127 A1 (24 Aug. 2016). The test uses a PolymerChar crystallization elution fractionation (CEF) instrument equipped with an IR-5 detector (PolymerChar) and two angle light scattering detectors Model 2040 (Precision Detectors, currently Agilent Technologies). The CEF instrument is equipped with an autosampler with N$_2$ purging capability.

The iCCD column is packed with gold coated nickel particles (Bright 7GNM8-NiS, Nippon Chemical Industrial Co.) in a 15 cm (length) X¼" (ID) stainless tubing. The column is packed and conditioned using the slurry method described in the Cong et al patent above. The final pressure with trichlorobenzene slurry packing is 150 Bars.

Column temperature calibration is performed using a mixture of.

Solvent: o-dichlorobenzene (ODCB, 99% anhydrous grade or technical grade);

Reference material: Linear homopolymer polyethylene (having zero comonomer content, Melt index (I$_2$) of 1.0 dg/min., polydispersity (Mw/Mn) about 2.6), in a concentration of 1.0 mg/ml; and Reference material: Eicosane (2 mg/ml).

iCCD temperature calibration is performed in four steps:

a. Calculating the delay volume, which is defined as the temperature offset between the measured peak elution temperature of Eicosane minus 30.0° C.;

b. Subtracting the temperature offset of the elution temperature from iCCD raw temperature data. This temperature offset is a function of experimental conditions, such as elution temperature, elution flow rate, etc.;

c. Creating a linear calibration line transforming the elution temperature across a range of 30.0° C. and 140.0° C. so that the linear homopolymer polyethylene reference has a peak temperature at 101.0° C., and Eicosane has a peak temperature of 30.0° C.;

d. For the soluble fraction measured isothermally at 30° C., the elution temperature below 30.0° C. is extrapolated linearly by using the elution heating rate of 3° C./min as described in Cerk et al., U.S. Pat. No. 9,688,795 B2) at col. 12, lines 1-3 and FIG. 1.

To prepare samples, the polymer to be measured is mixed with ODCB in an autosampler at 4 mg/ml (unless otherwise specified) and shaken for 1 hour shaking at 158° C. A 200 μl portion of the sample is injected. The crystallization temperature profile is 3° C./min from 110° C. to 30° C., the thermal equilibrium is at 30° C. for 2 minutes (including Soluble Fraction Elution Time being set as 2 minutes), the elution is performed at 3° C./min from 30° C. to 145° C. The flow rate during crystallization is 0.0 ml/min. The flow rate during elution is 0.50 ml/min. The data was collected at one data point/second.

The molecular weight of polymer and the molecular weight of the polymer fractions is determined directly from the light scattering detector (90 degree angle) and concentration detector (IR-5) according the Rayleigh-Gans-Debys approximation (described in Striegel and Yau, Modern Size Exclusion Liquid Chromatogram, Page 242 and Page 263) by assuming the form factor is 1 and all the virial coefficients are equal to zero. Integration windows are set to integrate all the chromatograms in the elution temperature (temperature calibration is specified above) range from 23.0° C. to 120° C. The molecular weight calculations and calibrations are performed in GPCOne™ software.

The calculation of Molecular Weight (Mw) from iCCD includes the following steps:

Measuring the interdetector offset. The offset is defined as the geometric volume offset between the light scattering detector with respect to concentration detector. It is calculated as the difference in the elution volume (mL) of polymer peak between concentration detector and light scattering chromatograms. The interdetector offset is converted to the temperature offset by using elution thermal rate and elution flow rate.

The MW detector constant is calculated by using an HDPE sample with a known weight-average molecular weight in the range of 100,000 to 140,000 g/mol and the area ratio of the LS and concentration integrated signals. A linear high density polyethylene (having zero comonomer content, melt index (I2) of 1.0, polydispersity Mw/Mn approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C.

The flow rate during crystallization is 0.0 ml/min.

The flow rate during elution is 0.80 ml/min.

Sample concentration is 1.0 mg/ml.

Each LS datapoint in LS chromatogram is shifted to correct for the interdetector offset before integration. Baseline subtracted LS and concentration chromatograms are integrated for the whole eluting temperature range of the Step (1).

Mw of the polymer is calculated by using the ratio of integrated light scattering detector (90 degree angle) to the concentration detector and using the MW detector constant.

The iCCD elution curve displays in "dW$_f$/dT versus elution temperature", where dW$_f$/dT is the weight fraction (W$_f$) of the polymer eluting at temperature of T. Calculate the weight percentage of the elution fractions from 25° C. to 35° C. (w %$_{25-35}$) and the weight percentage of the elution fractions from 35° C. to 100° C. (w %$_{35-100}$) using the equations below.

$$w \%_{25-35} = \frac{\int_{25}^{35} dW_f/dT * dT}{\int_{25}^{120} dW_f/dT * dT} * 100\%$$

-continued $$w \%_{35-100} = \frac{\int_{35}^{100} dW_f/dT * dT}{\int_{25}^{120} dW_f/dT * dT} * 100\%$$

Seal Strength Test: Bags are made with internal dimensions of 15 cm width by 20 cm height, by sealing two layers of film together on three sides to leave one side open for filling. The seals are made using a Lako SL-2 Digital Heat Sealer. The sealing conditions are: Temperature: 200° C. Pressure: 6.8 psi. Seal width: 1 mm. Dwell time: 0.5 s. The bags are allowed to cool to room temperature before use.

Silicone oil is heated and equilibrated at 140° C.

An empty bag is placed in a 1 L container, and the hot oil at 140° C. is poured into the bag. The bag is immediately sealed and tested using a J&B Model 4000 HotTack tester with the following settings: Sample width: 25 mm. Seal bar width: 5 mm. Seal pressure: 0.275 MPa. Seal time: 0.5 s. Cool time: 24 hr. Peel speed: 500 mm/min.

EXAMPLES

The Examples use the polymers shown in Table 1. An iCCD analysis is performed on a sample of each polypropylene resin as described in the Test Methods. The results are shown in FIG. 1 and Table 1.

TABLE 1

| Name | Supplier | Resins | Ethylene Content (wt %) | Density (g/cc) | MI (dg/min) | iCCD 25° C.- 35° C. (wt %) | iCCD 35° C.- 105° C. (wt %) |
|---|---|---|---|---|---|---|---|
| PE1 | Dow | ELITE ™ AT 6202 enhanced PE resin | | 0.908 | 0.85 | | |
| PE2 | Dow | AGILITY ™ 1500 LDPE resin | | 0.920 | 0.15 | | |
| PE3 | Exxon | EXCEED ™ 1018 PE copolymer | | 0.918 | 1 | | |
| Homo-PP | Formosa | B1101 PP homopolymer | 0 | 0.9 | 0.5 | 2.15 | 7.02 |
| Block-PP | Petrochina Dushanzi | K8003 PP impact copolymer | 15 | 0.9 | 2.5 | 15.63 | 14.67 |
| Random-PP | Braskem | DS6D82 PP random copolymer | 6 | 0.9 | 7 | 10.78 | 89.18 |

The polymers from Table 1 are extruded as 3-layer films on a blown-film extrusion line under the conditions shown in Table 2.

TABLE 2

| Screw: | 1.25 inch, L/D = 28:1 |
|---|---|
| Die | 3 in |
| Cooling | Dual Lip Air Ring |
| Nominal Output | 30-45 kg/hr |
| Thickness | 35-135 micron |
| Lay Flat | 175-350 mm |
| Blow-Up Ratio | 1.5:1 to 3:1 |

The contents of each film are shown in Table 3. Films are tested for thickness, dart impact strength, tear resistance, hot-fill seal strength and pinholes, and results are shown in Table 3.

TABLE 3

| | IE1 | IE2 | CE1 | CE2 |
|---|---|---|---|---|
| Layer 1 (Heat Seal) | 60% PE1 + 40% Block-PP | 60% PE3 + 40% Block-PP | 60% PE1 + 40% Homo-PP | 60% PE1 + 40% Random-PP |
| Layer 2 (Core) | 40% PE2 + 45% Block PP + 15% PE1 | 40% PE2 + 45% Block PP + 15% PE1 | 40% PE2 + 45% Homo-PP + 15% PE1 | 40% PE2 + 45% Random-PP + 15% PE1 |
| Layer 3 | 60% PE1 + 40% Block-PP | 60% PE3 + 40% Block-PP | 60% PE1 + 40% Homo-PP | 60% PE1 + 40% Random-PP |
| Layer ratio (thickness) | 1/2/1 | 1/2/1 | 1/2/1 | 1/2/1 |
| Film Thickness (micron) | 125 | 125 | 125 | 125 |
| Dart impact, Type A (g) | 703 | 375 | 321 | 567 |
| Tear resistance, MD (g) | 802 | 628 | 581 | 1368 |
| Tear resistance, TD (g) | 1477 | 717 | 756 | 2019 |
| Gelbo Flex Test - 5400 cycles (Pinholes), | 2.5 | 5 | 19 | 20 |
| Seal Strength - 140° C. (N/25 mm) | 6.42 | 0.785 | 11.3 | 32.73 |

TABLE 3-continued

|  | IE1 | IE2 | CE1 | CE2 |
|---|---|---|---|---|
| Seal Strength - 150° C. (N/25 mm) | 43.6 | 35.4 | 17.6 | 31.0 |
| Seal Strength - 160° C. (N/25 mm) | 50.6 | 45.7 | 23.9 | 33.3 |
| Seal Strength - 170° C. (N/25 mm) | 60.0 | 61.7 | 39.6 | 34.7 |
| Seal Strength - 180° C. (N/25 mm) | 56.7 | 64.3 | 46.4 | 30.5 |
| Seal Strength - 190° C. (N/25 mm) | 58.4 | 67.2 | 49.8 | 39.0 |
| Seal Strength - 200° C. (N/25 mm) | 59.6 | 66.7 | 46.4 | 35.8 |

Aspect 1. A multilayer film comprising at least (A) a core layer that comprises a polyolefin polymer and (B) a heat seal layer, wherein the heat seal layer comprises: a. from 30 to 80 weight percent of a polypropylene copolymer having: i. a total ethylene content (Et) from 5 to 30 weight percent, based on the total weight of the polypropylene copolymer; and ii. a density from 0.80 to 0.95 g/cc; and iii. a melt index at 230° C. of no more than 5 dg/min; and iv. an iCCD profile where in iCCD elution testing from 25° C. to 150° C., elutes at least 10 weight percent of the polypropylene copolymer from 25° C. to 35° C. and no more than 30 weight percent of the polypropylene copolymer between 35° C. and 100° C.; and b. from 20 to 70 weight percent of a polyethylene copolymer having a density from 0.895 to 0.925 g/cc and melt index at 190° C. below 3 dg/min.

Aspect 2. The multilayer film of aspect 1, wherein the core layer comprises a polyethylene having a density from 0.895 to 0.930 g/cc and a melt index at 190° C. below 3 dg/min.

Aspect 3. The multilayer film of aspect 1 or aspect 2, wherein the polypropylene copolymer of the heat seal layer has: a. a total ethylene content (Et) from 8 to 20 weight percent, based on the total weight of the polypropylene copolymer; and b. a density from 0.895 to 0.910 g/cc; and c. a melt index (I2) at 230° C. of 1 to 3 dg/min.

Aspect 4. The multilayer film of aspect 1 to 3, wherein the core layer comprises from 25 to 65 weight percent of the polypropylene copolymer, and from 35 to 75 weight percent of a polyethylene having a density from 0.895 to 0.930 g/cc and a melt index at 190° C. below 3 dg/min.

Aspect 5. The multilayer film of aspect 1 to 4, wherein the core layer and the heat seal layer comprise polyethylene having a density from 0.905 to 0.922 g/cc and a melt index at 190° C. from 0.1 to 1.0 dg/min.

Aspect 6. The multilayer film of aspect 1 to 5, wherein the polypropylene copolymer has an iCCD elution profile where in iCCD elution testing from 25° C. to 150° C., from 12 to 18 weight percent of the polypropylene copolymer elutes at temperatures from 25° C. to 35° C.

Aspect 7. The multilayer film of aspect 1 to 6, wherein the polypropylene copolymer has an iCCD elution profile where in iCCD elution testing from 25° C. to 150° C., from 10 to 20 weight percent of the polypropylene copolymer elutes at temperatures between 35° C. and 100° C.

Aspect 8. The multilayer film of aspect 1 to 7, wherein the polypropylene copolymer in the heat seal layer is an impact copolymer.

Aspect 9. The multilayer film of aspect 1 to 8, wherein the polypropylene copolymer in the heat seal layer is an impact copolymer and wherein: a. in iCCD elution testing from 25° C. to 150° C., from 12 to 18 weight percent of the polypropylene copolymer elutes at temperatures between 25° C. and 35° C.; and b. in iCCD elution testing from 25° C. to 150° C., from 10 to 20 weight percent of the polypropylene copolymer elutes at temperatures between 35° C. and 100° C.

Aspect 10. The multilayer film of aspect 1 to 9, wherein the heat seal layer comprises from 35 to 50 weight percent of the polypropylene copolymer.

Aspect 11. The multilayer film of aspect 1 to 10, wherein the core layer comprises from 25 to 65 weight percent of a polypropylene copolymer as described in aspect 3, and from 35 to 75 weight percent polyethylene having a density from 0.895 to 0.930 g/cc and a melt index at 190° C. below 3 dg/min.

Aspect 12. The multilayer film of aspect 1 to 11, wherein the core layer and the heat seal layer comprise polyethylene having a density from 0.905 to 0.922 g/cc and a melt index at 190° C. from 0.1 to 1.0 dg/min.

Aspect 13. The multilayer film of aspect 1, wherein the heat seal layer comprises: a. from 35 to 50 weight percent of the polypropylene copolymer, wherein: i. the total ethylene content (Et) of the polypropylene copolymer is from 8 to 20 weight percent, based on the total weight of the polypropylene copolymer; and ii. the density of the polypropylene copolymer is from 0.895 to 0.910 g/cc; and iii. the melt index (I2) at 230° C. of the polypropylene copolymer is 1 to 3 dg/min; iv. in iCCD elution testing from 25° C. to 150° C., from 12 to 18 weight percent of the polypropylene copolymer elutes at temperatures between 25° C. and 35° C.; and v. in iCCD elution testing from 25° C. to 150° C., from 10 to 20 weight percent of the polypropylene copolymer elutes at temperatures between 35° C. and 100° C.; and b. from 50 to 65 weight percent of the polyethylene copolymer having a density from 0.900 to 0.912 g/cc and a melt index from 0.5 to 1.5 dg/min.

Aspect 14. A bag comprising the multilayer film from any one of aspects 1 to 13.

Aspect 15. A process to package heated materials, comprising the steps of: a. placing materials with a temperature of at least 90° C. in the bag of aspect 14 that is open at one end, and b. heat sealing the open end of the bag to fully close the bag.

We claim:

1. A multilayer film comprising at least (A) a core layer that comprises a polyolefin polymer and (B) a heat seal layer, wherein the heat seal layer comprises:

a) from 30 to 80 weight percent of a polypropylene copolymer having:
  i) a total ethylene content (Et) from 5 to 30 weight percent, based on the total weight of the polypropylene copolymer; and
  ii) a density from 0.80 to 0.95 g/cc; and
  iii) a melt index at 230° C. of no more than 5 dg/min; and
  iv) an iCCD profile where in iCCD elution testing from 25° C. to 150° C., elutes at least 10 weight percent of the polypropylene copolymer from 25° C. to 35° C. and no more than 30 weight percent of the polypropylene copolymer between 35° C. and 100° C.; and
b) from 20 to 70 weight percent of a polyethylene copolymer having a density from 0.895 to 0.925 g/cc and melt index at 190° C. below 3 dg/min.

2. The multilayer film of claim 1, wherein the core layer comprises a polyethylene having a density from 0.895 to 0.930 g/cc and a melt index at 190° C. below 3 dg/min.

3. The multilayer film of claim 1, wherein the polypropylene copolymer of the heat seal layer has:
a) a total ethylene content (Et) from 8 to 20 weight percent, based on the total weight of the polypropylene copolymer; and
b) a density from 0.895 to 0.910 g/cc; and
c) a melt index (I2) at 230° C. of 1 to 3 dg/min.

4. The multilayer film of claim 1, wherein the core layer comprises from 25 to 65 weight percent of the polypropylene copolymer, and from 35 to 75 weight percent of a polyethylene having a density from 0.895 to 0.930 g/cc and a melt index at 190° C. below 3 dg/min.

5. The multilayer film of claim 1, wherein the core layer and the heat seal layer comprise polyethylene having a density from 0.905 to 0.922 g/cc and a melt index at 190° C. from 0.1 to 1.0 dg/min.

6. The multilayer film of claim 1, wherein the polypropylene copolymer has an iCCD elution profile where in iCCD elution testing from 25° C. to 150° C., from 12 to 18 weight percent of the polypropylene copolymer elutes at temperatures from 25° C. to 35° C.

7. The multilayer film of claim 1, wherein the polypropylene copolymer has an iCCD elution profile where in iCCD elution testing from 25° C. to 150° C., from 10 to 20 weight percent of the polypropylene copolymer elutes at temperatures between 35° C. and 100° C.

8. The multilayer film of claim 1, wherein the polypropylene copolymer in the heat seal layer is an impact copolymer.

9. The multilayer film of claim 1, wherein the polypropylene copolymer in the heat seal layer is an impact copolymer and wherein:

a) in iCCD elution testing from 25° C. to 150° C., from 12 to 18 weight percent of the polypropylene copolymer elutes at temperatures between 25° C. and 35° C.; and
b) in iCCD elution testing from 25° C. to 150° C., from 10 to 20 weight percent of the polypropylene copolymer elutes at temperatures between 35° C. and 100° C.

10. The multilayer film of claim 1, wherein the heat seal layer comprises from 35 to 50 weight percent of the polypropylene copolymer.

11. The multilayer film of claim 1, wherein the core layer comprises from 25 to 65 weight percent of a polypropylene copolymer, and from 35 to 75 weight percent polyethylene having a density from 0.895 to 0.930 g/cc and a melt index at 190° C. below 3 dg/min, wherein the polypropylene copolymer of the core layer has:
a) a total ethylene content (Et) from 8 to 20 weight percent, based on the total weight of the polypropylene copolymer; and
b) a density from 0.895 to 0.910 g/cc; and
c) a melt index (I2) at 230° C. of 1 to 3 dg/min.

12. The multilayer film of claim 11, wherein the core layer and the heat seal layer comprise polyethylene having a density from 0.905 to 0.922 g/cc and a melt index at 190° C. from 0.1 to 1.0 dg/min.

13. The multilayer film of claim 1, wherein the heat seal layer comprises:
a) from 35 to 50 weight percent of the polypropylene copolymer, wherein:
  i) the total ethylene content (Et) of the polypropylene copolymer is from 8 to 20 weight percent, based on the total weight of the polypropylene copolymer; and
  ii) the density of the polypropylene copolymer is from 0.895 to 0.910 g/cc; and
  iii) the melt index (I2) at 230° C. of the polypropylene copolymer is 1 to 3 dg/min,
  iv) in iCCD elution testing from 25° C. to 150° C., from 12 to 18 weight percent of the polypropylene copolymer elutes at temperatures between 25° C. and 35° C.; and
  v) in iCCD elution testing from 25° C. to 150° C., from 10 to 20 weight percent of the polypropylene copolymer elutes at temperatures between 35° C. and 100° C.; and
b) from 50 to 65 weight percent of the polyethylene copolymer having a density from 0.900 to 0.912 g/cc and a melt index from 0.5 to 1.5 dg/min.

14. A bag comprising the multilayer film from claim 1.

15. A process to package heated materials, comprising the steps of:
a) placing materials with a temperature of at least 90° C. in a bag that is open at one end, and
heat sealing the open end of the bag to fully close the bag, wherein the bag comprises the multilayer film from claim 1.

* * * * *